United States Patent
Chaudhuri et al.

(10) Patent No.: US 9,306,391 B2
(45) Date of Patent: Apr. 5, 2016

(54) DIRECT CURRENT TRANSMISSION AND DISTRIBUTION SYSTEM AND METHOD OF OPERATING THE SAME

(71) Applicant: General Electric Company, Schenectady, NY (US)

(72) Inventors: Nilanjan Ray Chaudhuri, Niskayuna, NY (US); Ranjan Kumar Gupta, Schenectady, NY (US); Rajib Datta, Niskayuna, NY (US); Ravisekhar Nadimpalli Raju, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 488 days.

(21) Appl. No.: 13/842,844

(22) Filed: Mar. 15, 2013

(65) Prior Publication Data
US 2014/0265583 A1 Sep. 18, 2014

(51) Int. Cl.
*H02J 1/00* (2006.01)
*H02J 3/36* (2006.01)
(Continued)

(52) U.S. Cl.
CPC ... *H02J 1/00* (2013.01); *H02J 3/36* (2013.01); *H02J 3/386* (2013.01); *H02J 13/0086* (2013.01); *Y02E 10/763* (2013.01); *Y02E 40/72* (2013.01);
(Continued)

(58) Field of Classification Search
CPC ......... H02J 13/0086; H02J 3/36; H02J 3/386; H02J 13/00; Y02E 10/763; Y02E 60/60; Y04S 10/123
USPC .......................................................... 307/52
See application file for complete search history.

(56) References Cited

U.S. PATENT DOCUMENTS

| 6,654,216 | B2 | 11/2003 | Horvath et al. |
| 7,110,231 | B1 | 9/2006 | De La Ree et al. |

(Continued)

FOREIGN PATENT DOCUMENTS

| EP | 0013005 B1 | 9/1984 |
| EP | 1973220 A1 | 9/2009 |

(Continued)

OTHER PUBLICATIONS

European Search Report issued in connection with corresponding EP Application No. 14150641.0 on Jul. 18, 2014.

(Continued)

*Primary Examiner* — Thienvu Tran
*Assistant Examiner* — Thai Tran
(74) *Attorney, Agent, or Firm* — Nitin N. Joshi

(57) ABSTRACT

A direct current (DC) transmission and distribution (T&D) system includes a plurality of DC-to-DC converter devices defining a plurality of isolatable portions of the DC T&D system. The DC T&D system also includes a DC T&D control system coupled to the DC-to-DC converter devices. The DC T&D control system includes a plurality of current sensors. At least one of the current sensors is positioned at one of the DC-to-DC converter devices. The current sensor is configured to transmit signals representative of a value of DC electric current transmission through the DC-to-DC converter device. The DC T&D control system also includes a plurality of processors. At least one processor is coupled to the current sensor and the DC-to-DC converter device. The processor is configured to regulate DC current transmission through the DC-to-DC converter device as a function of the value of DC current transmission through the DC-to-DC converter device.

15 Claims, 7 Drawing Sheets

(51) Int. Cl.
*H02J 3/38* (2006.01)
*H02J 13/00* (2006.01)

(52) U.S. Cl.
CPC ............... *Y02E 60/60* (2013.01); *Y04S 10/123* (2013.01); *Y10T 307/549* (2015.04)

(56) References Cited

U.S. PATENT DOCUMENTS

| | | | |
|---|---|---|---|
| 7,652,395 | B2 | 1/2010 | Von Arx et al. |
| 7,751,166 | B2 | 7/2010 | Stoupis et al. |
| 8,121,740 | B2 | 2/2012 | Yang et al. |
| 2010/0036538 | A1 | 2/2010 | Stergiou et al. |
| 2010/0161151 | A1* | 6/2010 | Yang et al. ............ 700/297 |
| 2011/0301772 | A1* | 12/2011 | Zuercher et al. ......... 700/293 |
| 2012/0126626 | A1 | 5/2012 | Falk et al. |
| 2012/0175962 | A1* | 7/2012 | Zhan et al. ............. 307/82 |
| 2012/0217749 | A1 | 8/2012 | Castelli Dezza et al. |
| 2013/0193766 | A1* | 8/2013 | Irwin et al. ............ 307/82 |

FOREIGN PATENT DOCUMENTS

| | | |
|---|---|---|
| EP | 2282388 A1 | 2/2011 |
| EP | 2477297 A1 | 7/2012 |
| JP | 2005312287 A | 11/2005 |
| WO | 0152379 A2 | 7/2001 |
| WO | 2012052325 A1 | 4/2012 |
| WO | 2012084693 A1 | 6/2012 |

OTHER PUBLICATIONS

Park, "Fault Detection and Isolation in Low-Voltage Dc Distribution System", University of Colorado, EERE, Energy Innovation Portal, 2012.

De Kerf, et al., Wavelet-Based Protection Strategy for DC Faults in Multi-Terminal VSC HVDC Systems, The Institution of Engineering and Technology, 2011, pp. 496-503, vol. 5, Iss. 4, IET Generation Transmission & Distribution.

Li, et al., Fault Detection and Self-Restore Control for Linear Systems, Proceedings of the Sixth International Conference on Intelligent Systems Design and Applications, 2006, 6 pages, IEEE Computer Society.

Mallick, et al, Fault Analysis of Voltage-Source Converter Based Multi-Terminal HVDC Transmission Links, IEEE, 2011, 7 pages.

Tang, et al., Protection of VSC-Multi-Terminal HVDC Against DC Faults, IEEE, 2002, pp. 719-724.

Tang, et al, Locating and Isolating DC Faults in Multi-Terminal DC Systems, IEEE Transactions on Power Delivery, 2007, pp. 1877-1884, vol. 22, No. 3.

Yang, et al., Multiterminal DC wind Farm Collection Grid Internal Fault Analysis and Protection Design, IEEE Transactions on Power Delivery, 2010, pp. 2308-2318, vol. 25, No. 4.

Zhang, et al., Distributed Fault Detection and Isolation for Multimachine Power Systems, IEEE, 2012, pp. 241-246.

* cited by examiner

500

| Fault location | Sign (Peak Current) | | | | |
|---|---|---|---|---|---|
| | I1 (Node 404) | I2 (Node 406) | I3 (Node 412) | I4 (Node 414) | I5 (Node 420) |
| a | -1 | -1 | -1 | -1 | x |
| b | 1 | -1 | -1 | -1 | x |
| c | 1 | 1 | -1 | -1 | x |
| d | 1 | 1 | 1 | -1 | x |
| e | 1 | 1 | 1 | 1 | x |

-1 : reversal
1 : no reversal

FIG. 7

DIRECT CURRENT TRANSMISSION AND DISTRIBUTION SYSTEM AND METHOD OF OPERATING THE SAME

STATEMENT REGARDING FEDERALLY SPONSORED RESEARCH & DEVELOPMENT

This invention was made with Government support under contract number DE-AR0000224 awarded by the Advanced Research Projects Agency-Energy (ARPA-E). The Government may have certain rights in this invention.

BACKGROUND

The field of the disclosure relates generally to high voltage direct current (HVDC) transmission and distribution (T&D) systems and, more particularly, to systems and methods of operation thereof.

At least some of known electric power generation facilities are physically positioned in a remote geographic region or in an area where physical access is difficult. One example includes power generation facilities geographically located in rugged and/or remote terrain, for example, mountainous hillsides, extended distances from the customers, and off-shore, e.g., off-shore wind turbine installations. More specifically, these wind turbines may be physically nested together in a common geographic region to form a wind turbine farm and are electrically coupled to a common alternating current (AC) collector system. Many of these known wind turbine farms include a separated power conversion assembly, or system, electrically coupled to the AC collector system. Such known separated power conversion assemblies include a rectifier portion that converts the AC generated by the power generation facilities to direct current (DC) and an inverter portion that converts the DC to AC of a predetermined frequency and voltage amplitude. The rectifier portion of the separated power conversion assembly is positioned in close vicinity of the associated power generation facilities and the inverter portion of the separated full power conversion assembly is positioned in a remote facility, such as a land-based facility. Such rectifier and inverter portions are typically electrically connected via submerged HVDC electric power cables that at least partially define an HVDC T&D system. Also, at least some known HVDC T&D systems are coupled to DC loads that do not required an inverter portion of AC conversion.

Many known HVDC T&D systems include mechanical isolation devices, e.g., circuit breakers and reclosers, positioned to define isolatable portions of the system. Such mechanical isolation devices may be opened to isolate electrical faults and, possibly, closed to restore as much of the system to service as possible once the fault is isolated. In addition, many known HVDC T&D systems include a Supervisory Control and Data Acquisition (SCADA) system, or some equivalent, that includes current and voltage sensors positioned therein to facilitate isolation and restoration operations. However, in contrast to AC T&D systems, due to the nature of DC, i.e., no zero-crossing of the amplitudes of DC voltages and currents as a function of time, such opening of the mechanical isolation devices requires opening the devices under load, thereby increasing the risk of arcing at the contactor portions of the mechanical isolation devices with a potential decrease of service life of the contactor portions. Also, in the event of an upward DC current excursion, it is generally considered that an operator has approximately five milliseconds (ms) to isolate the associated fault to avoid a potential decrease of service life of the components in the current path.

BRIEF DESCRIPTION

In one aspect, a direct current (DC) transmission and distribution (T&D) system is provided. The system includes a plurality of DC-to-DC converter devices at least partially defining a plurality of isolatable portions of said DC T&D system. The DC T&D system also includes a DC T&D control system coupled to the plurality of DC-to-DC converter devices. The DC T&D control system includes a plurality of current sensors. At least one of the plurality of current sensors is positioned at at least one DC-to-DC converter device of the plurality of DC-to-DC converter device. The at least one current sensor of the plurality of current sensors is configured to transmit at least one signal representative of a value of DC electric current transmission through the at least one DC-to-DC converter device. The DC T&D control system also includes a plurality of processors. At least one processor of the plurality of processors is coupled to the at least one current sensor and the at least one DC-to-DC converter device. The at least one processor is configured to regulate electrical parameters including at least DC current transmission through the at least one DC-to-DC converter device as a function of the value of DC current transmission through the at least one DC-to-DC converter device.

In a further aspect, a direct current (DC) transmission and distribution (T&D) control system for a DC T&D system is provided. The DC T&D system includes a plurality of DC-to-DC converter devices. The DC T&D control system includes a plurality of current sensors. At least one current sensor of the plurality of current sensors is positioned at each DC-to-DC converter device of the plurality of DC-to-DC converter devices. Each of the current sensors is configured to transmit at least one signal representative of a value of DC electric current transmission therethrough. The DC T&D control system also includes a plurality of processors coupled to the plurality of current sensors and the plurality of DC-to-DC converter devices. The plurality of processors is configured to determine an electrical fault on the DC T&D system and regulate DC current transmission through at least a portion of the plurality of DC-to-DC converter devices at least partially as a function of the value of DC current transmission through each of the plurality of DC-to-DC converter devices as a result of the electrical fault. The plurality of processors is also configured to determine DC current transmission in a first direction and in a second direction opposite the first direction through the DC T&D system.

In another aspect, a method of operating a direct current (DC) transmission and distribution (T&D) system is provided. The DC T&D system includes a plurality of DC-to-DC converter devices and a plurality of nodes each including at least one mechanical isolation device. The DC T&D system also includes a plurality of isolatable portions of the DC T&D system defined between the nodes. The method includes decreasing the DC electric current transmission through at least a portion of the plurality of isolatable portions at the electrical fault and regulating the at least one DC-to-DC converter device. The method also includes determining a direction of DC electric current transmission through each node of the plurality of nodes. The method further includes determining a location of an electrical fault on the DC T&D system at least partially as a function of a direction of DC electric current transmission through each node of the plurality of nodes. The method also includes isolating at least a portion of the plurality of isolatable portions comprising opening the at least one mechanical isolation device.

DRAWINGS

These and other features, aspects, and advantages of the present invention will become better understood when the following detailed description is read with reference to the accompanying drawings in which like characters represent like parts throughout the drawings, wherein:

FIG. 7 is a tabular view of current direction as a function of fault location that may be used with the system shown in FIG. 5.

Figure 1:
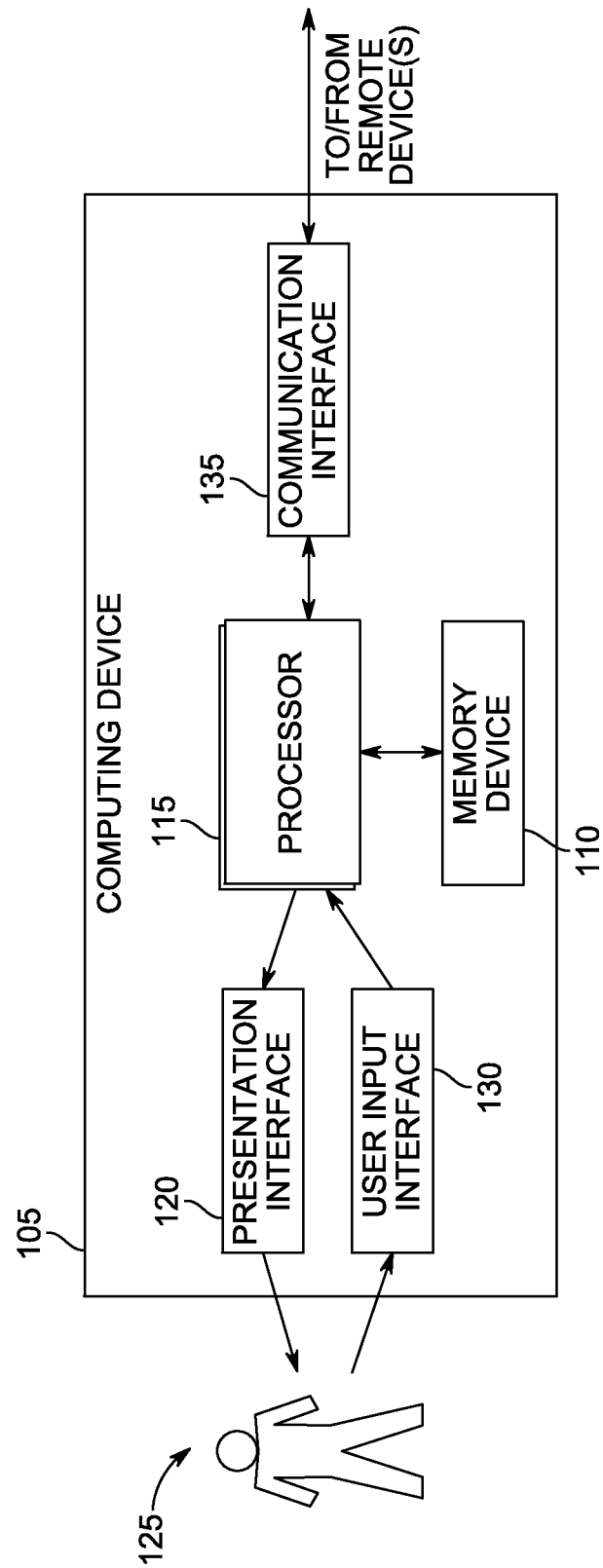
FIG. 1 is a block diagram of an exemplary computing device.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The HVDC transmission and distribution (T&D) systems described herein provide a cost-effective method for transmitting HVDC power. The embodiments described herein facilitate transmitting HVDC power across relatively large distances while facilitating rapid detection and selective isolation of electrical faults on the system. The embodiments described herein also facilitate rapid restoration of those portions of the system exclusive of the faulted portions. Specifically, the devices, systems, and methods described herein include a plurality of DC-to-DC converter devices and mechanical isolation devices that define nodes in the HVDC T&D system. Also, the DC-to-DC converter devices facilitate real-time decreasing of DC electric current therethrough in the event that DC current sensed being transmitted therethrough exceeds parameters. Further, the polarities of DC electric current as measured at each node are communicated in real time to a Supervisory Control and Data Acquisition (SCADA) system. Specifically, in the event that a reversed polarity of DC electric current in one or more nodes is sensed, the DC-to-DC converter device devices initiate operating associated mechanical isolation devices with a significantly reduced load that will approach zero amperes.

The devices, systems, and methods described herein facilitate system restoration. Once the electrical fault is cleared, the SCADA system will initiate post-fault recovery actions. Specifically, the cleared mechanical isolation devices will reclose under near-zero loads and the associated DC-to-DC converter devices will increase the current transmitted through the converters and the mechanical isolation devices to restore DC power transmission to the affected portions expeditiously.

FIG. 1 is a block diagram of an exemplary computing device 105 that may be used to perform monitoring of a high voltage direct current (HVDC) transmission and distribution (T&D) system (not shown in FIG. 1). More specifically, any piece of equipment, system, and process i.e., components of a HVDC T&D system, e.g., without limitation, DC-to-DC converter devices (not shown in FIG. 1), mechanical isolation devices and monitoring devices (not shown in FIG. 1). Computing device 105 includes a memory device 110 and a processor 115 operatively coupled to memory device 110 for executing instructions. Processor 115 may include one or more processing units, e.g., without limitation, in a multi-core configuration. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 1), and these terms are used interchangeably herein.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Memory device 110 may be configured to store operational measurements including, without limitation, real-time and historical vibration values, and/or any other type data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate monitoring and control of the components within a HVDC T&D system.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with the HVDC T&D system being monitored, such as by using a human machine interface (HMI) (not shown in FIG. 1).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices while performing as an input channel. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
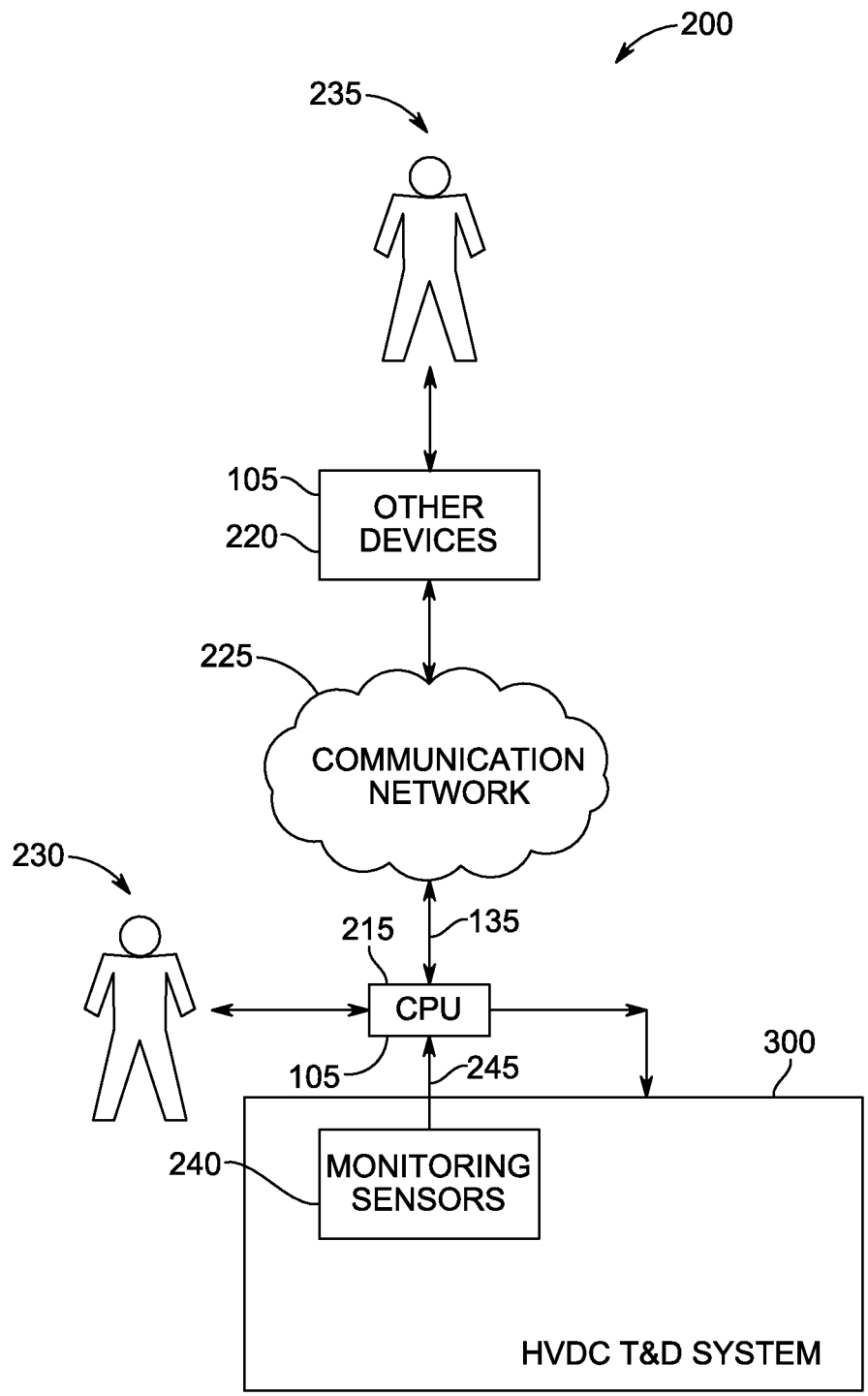
FIG. 2 is block diagram of a portion of an exemplary monitoring and control system that may include the computing device shown in FIG. 1.

FIG. 2 is block diagram of a portion of a monitoring and control system, i.e., in the exemplary embodiment, a Supervisory Control and Data Acquisition (SCADA) system 200 that may be used to monitor and control at least a portion of a HVDC T&D system 300. As used herein, the term "SCADA system" refers to any control and monitoring system that may monitor and control HVDC T&D system 300 across multiple sites and large distances.

In the exemplary embodiment, SCADA system 200 includes at least one central processing unit (CPU) 215 configured to execute monitoring algorithms and monitoring logic. CPU 215 may be coupled to other devices 220 via a communication network 225. CPU 215 may be, without limitation, a facility-level centralized CPU, a plant-level centralized CPU, one of a plurality of distributed CPUs, and a portable CPU. Alternatively, SCADA system 200 includes at least one central processing unit (CPU) 215 configured to execute control algorithms and control logic. CPU 215 may be, without limitation, a facility-level centralized controller, one of a plurality of distributed controllers, and a portable controller. Also, alternatively, SCADA system 200 merely provides data inputs to a separate CPU, or controller.

Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, CPU 215 may perform all of the operations below.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

As used herein, the terms "controller", "control system", "data acquisition system" and "processor" include any programmable system including systems and microcontrollers, reduced instruction set circuits, application specific integrated circuits, programmable logic circuits, and any other circuit capable of executing the functions described herein. The above examples are exemplary only, and thus are not intended to limit in any way the definition and/or meaning of the term processor. Moreover, in some embodiments, at least a portion of SCADA system 200 and additional portions (not shown) may be implemented within a broader control system (not shown) that enables operation of electric power generation units (not shown in FIG. 2) as described herein, including, without limitation, those processors resident within personal computers, remote servers, programmable logic controllers (PLCs), distributed control system (DCS) cabinets, and hand-held Internet-enabled devices.

CPU 215 interacts with a first operator 230, e.g., without limitation, via user input interface 130 and/or presentation interface 120. In one embodiment, CPU 215 presents information about HVDC T&D system 300, such as alarms, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining HVDC T&D system 300, including, without limitation, shift operations personnel, maintenance technicians, and facility supervisors.

In the exemplary embodiment, HVDC T&D system 300 includes one or more monitoring sensors 240 coupled to CPU 215 through at least one input channel 245. Monitoring sensors 240 collect operational measurements including, without limitation, DC voltages and currents generated within HVDC T&D system 300. Monitoring sensors 240 repeatedly, e.g., periodically, continuously, and/or upon request, transmit operational measurement readings at the time of measurement. CPU 215 receives and processes the operational measurement readings. Such data is transmitted across network 225 and may be accessed by any device capable of accessing network 225 including, without limitation, desktop computers, laptop computers, and personal digital assistants (PDAs) (neither shown). In alternative embodiments, CPU 215 includes, without limitation, sufficient data, algorithms, and commands to facilitate control of the DC current transmission through HVDC T&D system 300.

In the exemplary embodiment, monitoring sensors 240 may generate a large volume of data. Therefore, other devices 220 include at least one data server with a database and storage system that enables operation of HVDC T&D system 300 and SCADA system 200 as described herein.

Figure 3:
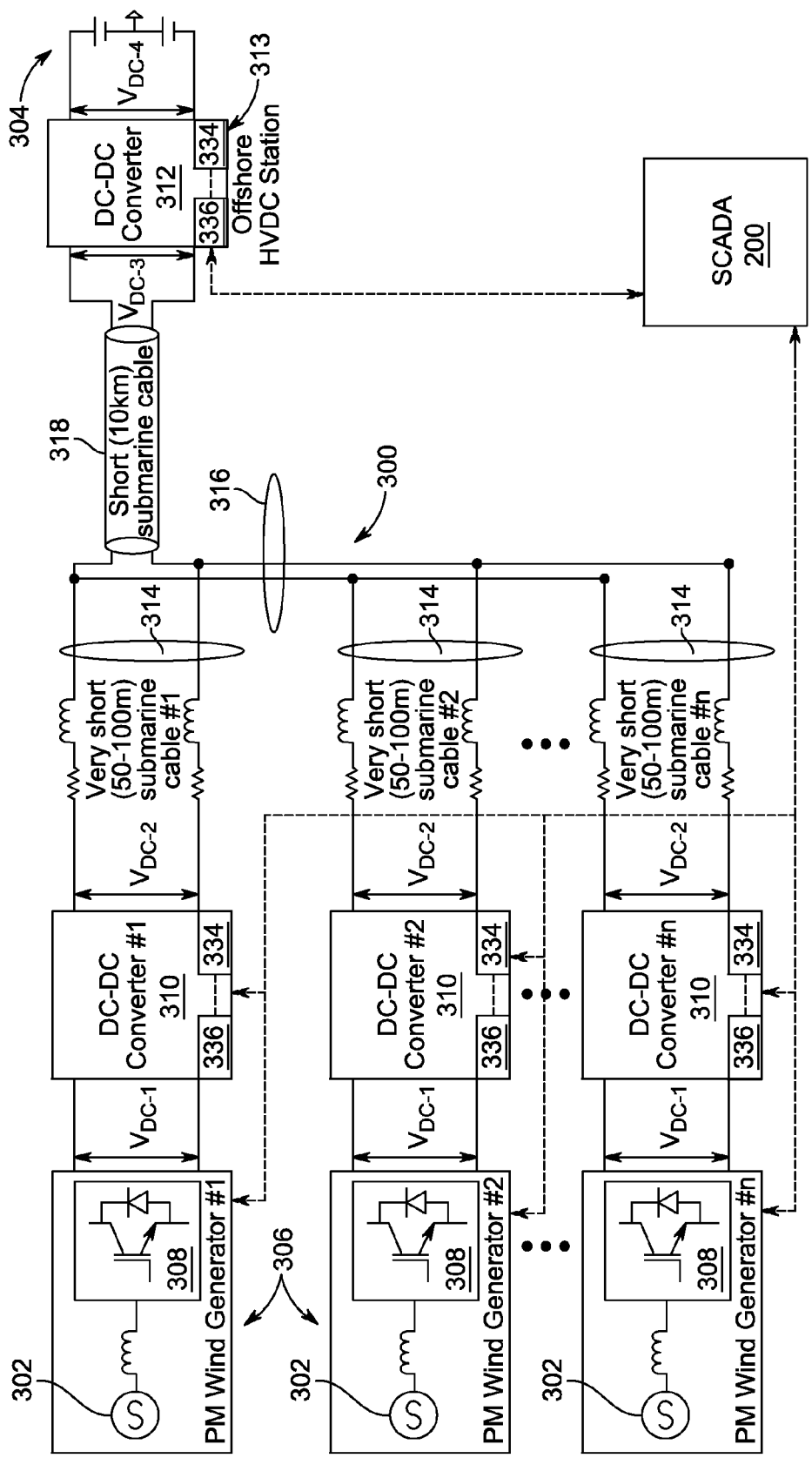
FIG. 3 is schematic diagram of an exemplary high voltage direct current (HVDC) transmission and distribution (T&D) system that may be monitored and controlled using the system shown in FIG. 2.

FIG. 3 is schematic diagram of exemplary high voltage direct current (HVDC) transmission and distribution (T&D) system 300 that may be monitored and controlled using SCADA system 200. In the exemplary embodiment, HVDC T&D system 300 couples a plurality of alternating current (AC) electric power generation devices 302 to an electric power transmission and distribution grid 304 that may be positioned hundreds, or thousands, of kilometers from devices 302.

Also, in the exemplary embodiment, each electric power generation device 302 is a permanent magnet (PM) wind turbine generator (WTG). Electric power generation devices 302 may be at least partially grouped geographically and/or electrically to define a renewable energy generation facility, i.e., a wind farm 306. Wind farm 306 is defined by a number of wind turbine generators in a particular geographic area, or alternatively, defined by the electrical connectivity of each wind turbine generator to a common substation. Wind farm 306 may be physically positioned in a remote geographical region or in an area where physical access is difficult. For example, and without limitation, wind farm 306 may be geographically located in rugged and/or remote terrain, e.g., mountainous hillsides, extended distances from the customers.

In the exemplary embodiment, wind farm 306, including electric power generation devices 302, is positioned offshore, i.e., devices 302 are off-shore PM WTG installations. Alternatively, electric power generation devices 302 may include any type of renewable electric power generation system including, for example, and without limitation, solar power generation systems, fuel cells, thermal power generators, geothermal generators, hydropower generators, diesel generators, gasoline generators, and/or any other device that generates power from renewable energy sources. Also, alternatively, electric power generation devices 302 may include any type of non-renewable electric power generation system including, for example, and without limitation, coal- and oil-fired facilities, gas turbine engines, nuclear power generation facilities and/or any other device that generates power from non-renewable energy sources. Moreover, any number of electric power generation devices 302 may be used from 1 to n devices.

Each electric power generation device 302 is coupled to an AC-to-DC rectifier device 308. AC-to-DC rectifier device 308 receives three-phase, sinusoidal, alternating current (AC) power from electric power generation device 302 and rectifies the three-phase, sinusoidal, AC power to direct current (DC) power at a predetermined voltage.

Also, in the exemplary embodiment, each of electric power generation devices 302 and each of AC-to-DC rectifier devices 308 are similar. Moreover, each of electric power generation devices 302 and each of AC-to-DC rectifier devices 308 are configured to transmit real-time operational status and feedback information to SCADA system 200 to receive commands from SCADA system 200. Alternatively, any control system architecture that enables operation of HVDC T&D system 300 and SCADA system 200 is used.

In the exemplary embodiment, HVDC T&D system 300 includes one DC-to-DC converter device 310 coupled to each AC-to-DC rectifier device 308. DC-to-DC converter device 310 receives DC power transmitted from AC-to-DC rectifier device 308 and converts the DC power having a first voltage $V_{DC-1}$ to DC power with a second pre-determined voltage $V_{DC-2}$ that facilitates long-range transmission to grid 304. HVDC T&D system 300 also includes a DC-to-DC converter device 312 coupled to all DC-to-DC converter devices 310. DC-to-DC converter device 312 is similar to DC-to-DC converter devices 310 with the exception that device 312 has a greater range of nameplate current and power ratings than devices 310.

DC-to-DC converter device 312 receives DC power transmitted from DC-to-DC converter devices 310. The DC power received at DC-to-DC converter device 312 is a third DC voltage $V_{DC-3}$ substantially representative of second pre-determined voltage $V_{DC-2}$ less line losses. DC-to-DC converter device 312 converts the DC power having the third voltage $V_{DC-3}$ to DC power with a fourth pre-determined voltage $V_{DC-4}$ that facilitates short-range transmission to grid 304. As shown, DC-to-DC converter device 312 is a portion of an offshore HVDC station 313.

Also, in the exemplary embodiment, each of DC-to-DC converter devices 310 and DC-to-DC converter device 312 are similar with the exception of nameplate ratings as necessary to enable operation of HVDC T&D system 300 and SCADA 200 as described herein. Moreover, each of DC-to-DC converter devices 310 and DC-to-DC converter device 312 include at least one DC current sensing device 334 (two shown). Each DC current sensing device 334 is a portion of monitoring sensors 240 (shown in FIG. 2) and is positioned within the associated DC-to-DC converter devices 310 and 312. Alternatively, DC current sensing device 334 is positioned as close as practical to the associated DC-to-DC converter devices 310 and 312, including, and without limitation, within DC switchgear cabinets (not shown) and within DC-to-DC converter control cabinets (not shown). DC current sensing devices 334 are configured to transmit real-time operational status and feedback information to SCADA system 200. Nodes 404 through 420 may also include any other sensing devices that enable operation of nodes 404 through 420 that may be used with HVDC T&D system 400 as described herein. Alternatively, any control system architecture that enables operation of HVDC T&D system 300 and SCADA system 200 is used.

Further, in the exemplary embodiment, each of DC-to-DC converter devices 310 and DC-to-DC converter device 312 include at least one controller 336 that includes at least one processor (not shown). As used herein, the terms "controller", "control system", and "processor" include any programmable system including systems and microcontrollers, reduced instruction set circuits, application specific integrated circuits, programmable logic circuits, and any other circuit capable of executing the functions described herein. The above examples are exemplary only, and thus are not intended to limit in any way the definition and/or meaning of the term processor. Moreover, controller 336 may include sufficient processing capabilities to execute support applications including, without limitation, those for SCADA system 200. In each of DC-to-DC converter devices 310 and 312, the associated controller 336 is coupled to associated DC current sensing device 334. Each controller 336 is also coupled to and/or a portion of SCADA system 200. Therefore, each of DC-to-DC converter devices 310 and 312 are configured to receive commands from other portions of SCADA system 200 through controllers 336.

Moreover, in the exemplary embodiment, HVDC T&D system 300 includes a plurality of HVDC transmission conduits 314, i.e., submarine cables that have short lengths in a range between approximately 50 meters (m) and approximately 100 m. HVDC T&D system 300 also includes HVDC transmission conduits 316, i.e., a submarine cable that acts as a HVDC bus for each of HVDC transmission conduits 314. HVDC T&D system 300 further includes a HVDC transmission conduit 318, i.e., a submarine cable that has an extended length of approximately 10 kilometers (km). Alternatively, HVDC transmission conduits 314, 316, and 318 have any configuration and lengths that enable operation of HVDC T&D system 300 and SCADA system 200 as described herein. Moreover, alternatively, HVDC transmission conduits 314, 316, and 318 include any number and configuration of conductors, e.g., without limitation, cables, ductwork, and busses that are manufactured of any materials that enable operation of HVDC T&D system 300 and SCADA system 200 as described herein.

In operation, each of AC electric power generation devices 302, i.e., each PM WTG in wind farm 306 generates three-phase, sinusoidal, AC power. AC-to-DC rectifier device 308 receives and rectifies the three-phase, sinusoidal, AC power to DC power at predetermined first voltage $V_{DC-1}$. DC-to-DC converter device 310 receives the DC power transmitted from AC-to-DC rectifier device 308 and converts the DC power having a first voltage $V_{DC-1}$ to DC power with a second pre-determined voltage $V_{DC-2}$ that facilitates long-range transmission across HVDC transmission conduits 314, 316, and 318 to offshore HVDC station 313. DC-to-DC converter device 312 receives the DC power transmitted across HVDC transmission conduits 314, 316, and 318 at the third DC voltage $V_{DC-3}$ that is substantially representative of second pre-determined voltage $V_{DC-2}$ less line losses. DC-to-DC converter device 312 converts the DC power having the third voltage $V_{DC-3}$ to DC power with a fourth pre-determined voltage $V_{DC-4}$ that facilitates short-range transmission to grid 304.

Figure 4:
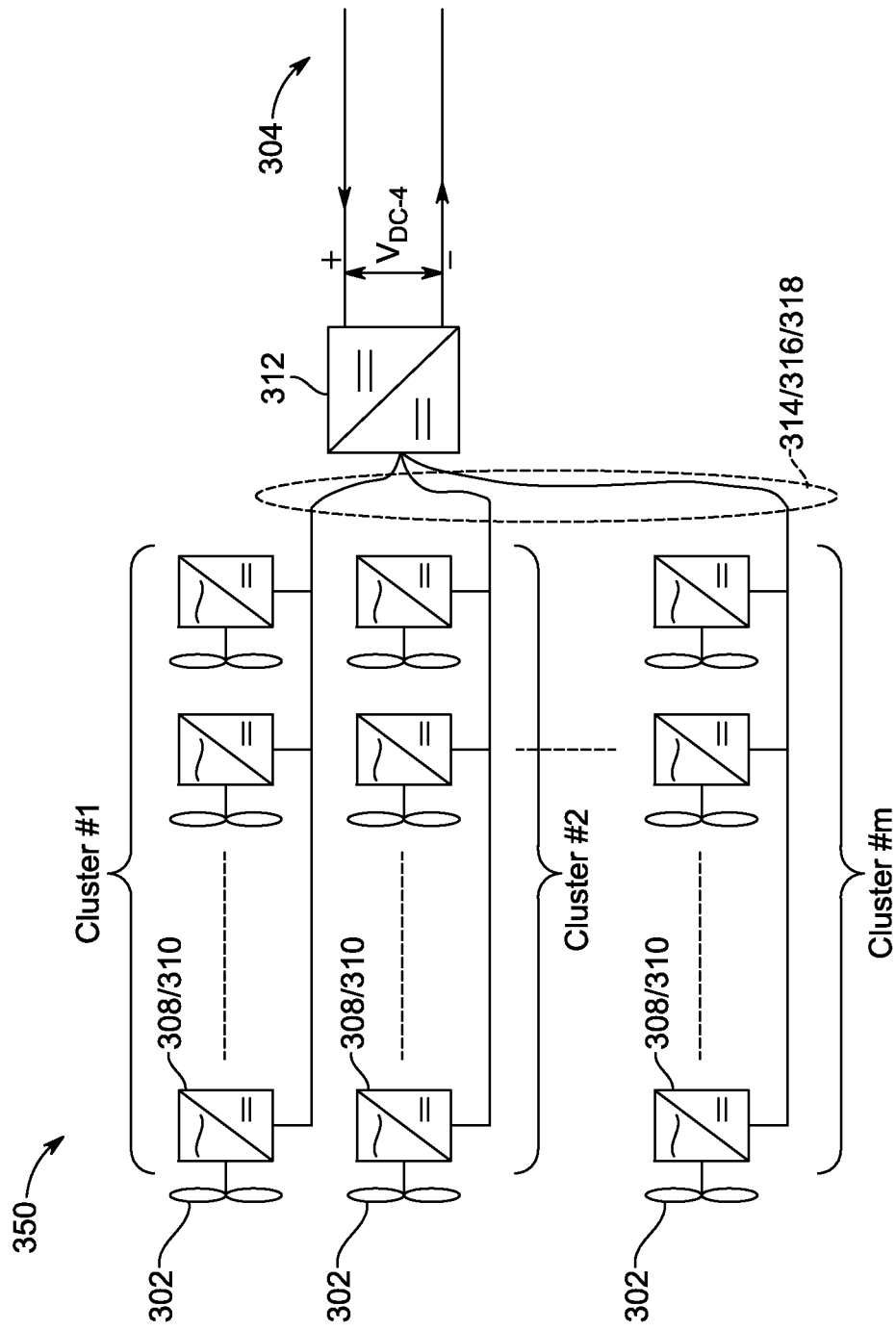
FIG. 4 is a schematic diagram of an alternative exemplary HVDC T&D system that may be monitored and controlled using the system shown in FIG. 2.

FIG. 4 is a schematic diagram of an alternative exemplary HVDC T&D system 350 that may be monitored and controlled using SCADA system 200 (shown in FIG. 2). HVDC T&D system 350 is similar to HVDC T&D system 300 with the exception that electric power generation devices 302 and associated AC-to-DC rectifier devices 308 and DC-to-DC converter devices 310 are arranged in clusters, e.g., Cluster #1, Cluster #2, up to Cluster #m.

Figure 5:
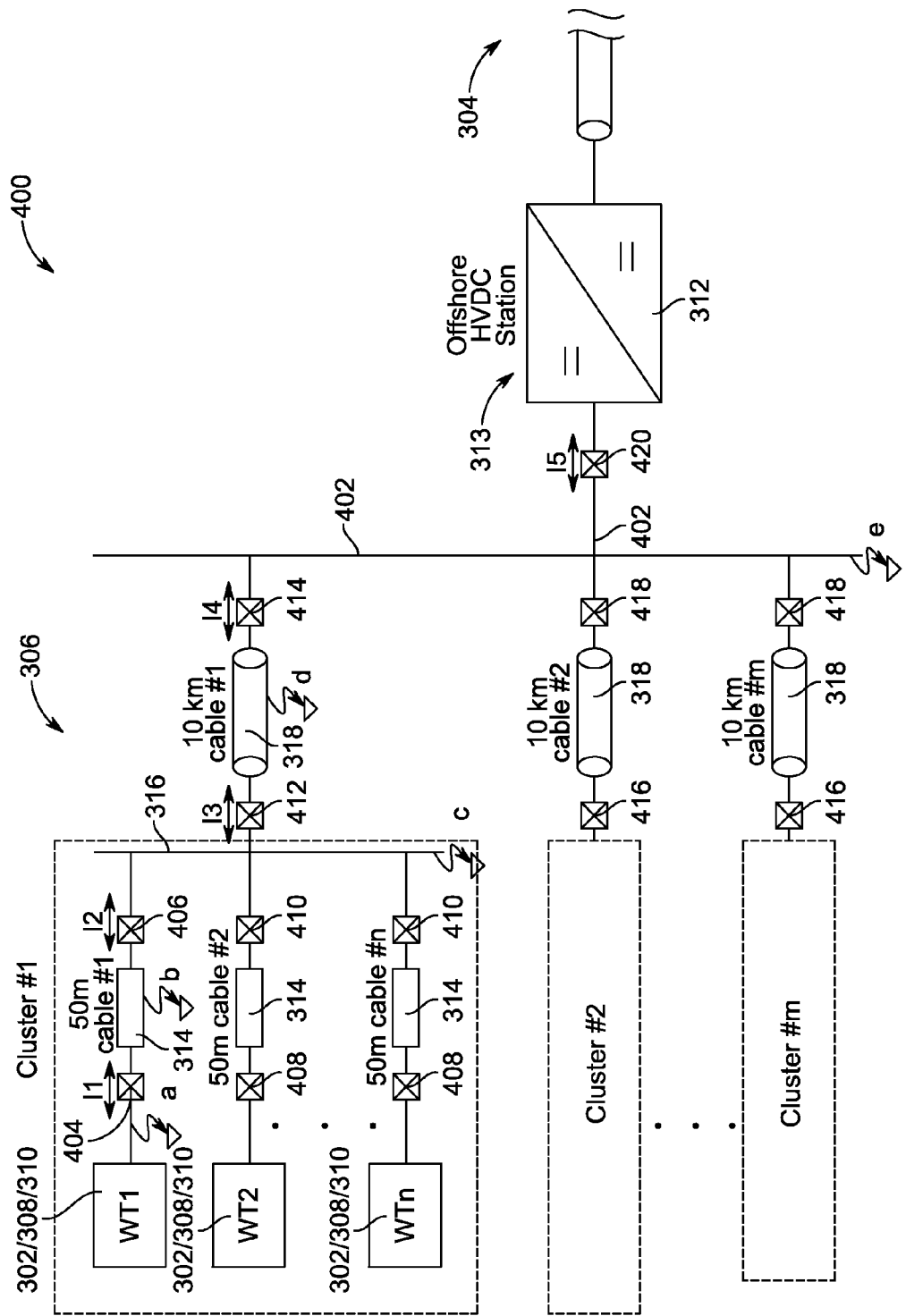
FIG. 5 is a schematic diagram of another alternative exemplary HVDC T&D system that may be monitored and controlled using the system shown in FIG. 2.

FIG. 5 is a schematic diagram of another alternative exemplary HVDC T&D system 400 that may be monitored and controlled using SCADA system 200 (shown in FIGS. 2 and 3). In the exemplary embodiment, HVDC T&D system 400 is similar to HVDC T&D systems 300 and 350 with a first exception that system 400 includes a plurality of submerged HVDC conduits 318 and a DC bus 402 coupling Cluster #1 through Cluster #m to DC-to-DC converter device 312. Also, HVDC T&D system differs from HVDC T&D systems 300 and 350 with a second exception that system 400 includes a plurality of nodes 404, 406, 408, 410, 412, 414, 416. 418, and 420.

Figure 6:
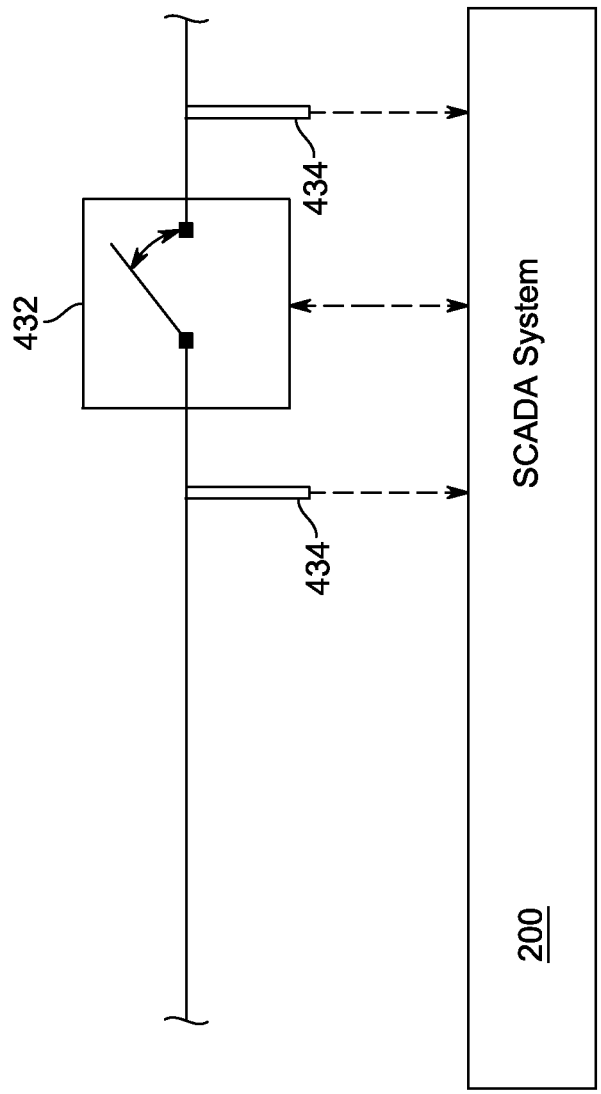
FIG. 6 is a schematic diagram of exemplary nodes that may be used with the system shown in FIG. 5.
Figure 6:
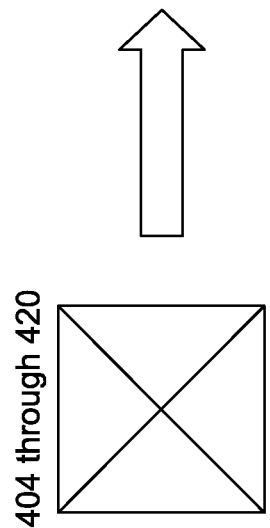

FIG. 6 is a schematic diagram of exemplary nodes 404 through 420 that may be used with HVDC T&D system 400 (shown in FIG. 5). In the exemplary embodiment, nodes 404 through 420 are defined by a mechanical isolation device 432, and at least one DC current sensing device 434 (two shown). Each DC current sensing device 434 is a portion of monitoring sensors 240 (shown in FIG. 2) and is positioned at the associated mechanical isolation device 432, i.e., as close as practical, including, and without limitation, within DC switchgear cabinets (not shown) and within DC circuit control cabinets. Nodes 404 through 420 may also include any other sensing devices that enable operation of nodes 404 through 420 that may be used with HVDC T&D system 400 as described herein.

Nodes 404 through 420 are similar with the exception of DC current and power nameplate ratings as necessary to enable operation of HVDC T&D system 400 and SCADA 200 as described herein. DC current sensing devices 434 are configured to transmit real-time DC current information to SCADA system 200. Moreover, mechanical isolation device 432 is configured to receive commands from SCADA system 200 and transmit status and feedback information to SCADA system 200.

Referring again to FIG. 5, nodes 404 through 420 define a plurality of isolatable portions of HVDC T&D system 400 between each pair of nodes. Such isolatable portions include, without exception, electric power generation devices 302, rectifier devices 308, and conduits 314, 316, and 318. A plurality of exemplary electrical fault locations are shown in FIG. 5, i.e., fault locations a, b, c, d, and e. Each are described further below.

FIG. 7 is a tabular view, i.e., table 500 is representative of a digital matrix defined within SCADA system 200 that may be used with HVDC T&D system 400 (shown in FIG. 5). Table 500 shows current direction I1, I2, I3, I4, and I5 as a function of fault location a, b, c, d, and e. I1 refers to the measured DC current at node 404, I2 refers to the measured DC current at node 406, I3 refers to the measured DC current at node 412, I4 refers to the measured DC current at node 414, and I5 refers to the measured DC current at node 420 (all nodes shown in FIG. 5). The numeral 1 represents DC current flowing in a defined forward direction with no reversal. The numeral −1 represents DC current flowing in the reverse of the defined forward direction, i.e., with reversal.

Referring to FIGS. 5, 6, and 7, a first fault location a is defined as positioned in Cluster #1 between a wind turbine 1 (WT1) electric power generation device 302 (with associated AC-to-DC rectifier device 308) and node 404. The currents are measured through current sensors 334 in DC-to-DC converter devices 310 and 312. As the current in DC-to-DC converter devices 310 and 312 rises at, or in excess of, a predetermined threshold, or the current exceeds a predetermined threshold, controller 336 blocks the local, or closest, DC-to-DC converter devices 310 and 312, i.e., controller 336 mitigates the current rise within affected devices 310 and 312, levels the current, and then decreases the current to approximately zero amperes substantially under 100 μs, i.e., within approximately 20 microseconds (μs) of fault detection by sensor 334. Therefore, fault a is rapidly isolated from grid 304 and the remainder of cables 314 in Cluster #1 prior to operation of any mechanical isolation devices. Fault isolation occurs approximately three orders of magnitude more rapidly than the typical five milliseconds (ms) needed to reduce a partial for a reduction of service life to the affected components. Such rapid fault isolation is primarily due to the localized communications between current sensor 334 and controller 336 rather than between current sensor 334 and remote portions of SCADA system 200.

While converter devices 310 and 312 are blocked, the portions of HVDC T&D system 300 to the left of converter device 312 in FIG. 5 behave as a passive network and the electric current therein behaves according to the natural response of the circuit without the effects of control devices, e.g., converter devices 310 and 312, and as a result, the current will oscillate through a zero crossing, similar to that for an AC current.

DC currents I1, I2, I3, I4, and I5 are measured at nodes 404, 406, 412, 414, and 420, respectively, through DC current sensors 434. In the exemplary embodiment, DC currents I1, I2, I3, and I4 are all reversed as shown in Table 500. SCADA system 200 makes a determination with respect to the fault being at location a due to the substantially instantaneous, real-time receipt of the directions of the DC current flows throughout system 400, including rapid changes and polarities. In response, SCADA system 200 directs mechanical isolation device 432 at node 404 to open at approximately zero amperes in less than 100 milliseconds (ms). SCADA system 200 directs reclosing of mechanical isolation device 432 at node 404 and deblocking of blocked converter devices 310, as a function of the status of mechanical isolation device 432 at node 404, to restore service. SCADA system 200 is also configured to block converter devices 310. However, such blocking commands will be transmitted in less than 100 ms as compared to the less than 100 μs expected if local control through controller 336 is used.

A second fault location b is defined as positioned in Cluster #1 on HVDC transmission conduit 314 between node 404 and node 406. Converter devices 310 and 312 operate as described above for fault location a. Currents I1, I2, I3, I4, and I5 are measured at nodes 404, 406, 412, 414, and 420, respectively, through DC current sensors 434. DC currents I2, I3, and I4 are all reversed as shown in Table 500 and DC current I1 is not reversed. SCADA system 200 makes a determination with respect to the fault being at location b due to the substantially instantaneous, real-time receipt of the directions of the DC current flows throughout system 400, including rapid changes and polarities. In response, SCADA system 200 directs mechanical isolation device 432 at nodes 404 and 406 to open and then directs restoration of service as described above for fault location a.

A third fault location c is defined as positioned in Cluster #1 on HVDC transmission conduit 316 between nodes 410 and 412. Converter devices 310 and 312 operate as described above for fault location a. Currents I1, I2, I3, I4, and I5 are measured at nodes 404, 406, 412, 414, and 420, respectively, through DC current sensors 434. DC currents I3 and I4 are both reversed as shown in Table 500 and DC currents I1 and I2 are not reversed. SCADA system 200 makes a determination with respect to the fault being at location c due to the substantially instantaneous, real-time receipt of the directions of the DC current flows throughout system 400, including rapid changes and polarities. In response, SCADA system 200 directs mechanical isolation device 432 at nodes 406, 410, and 412 to open and then directs restoration of service as described above for fault location a.

A fourth fault location d is defined as positioned downstream of Cluster #1 on HVDC transmission conduit 318 between nodes 412 and 414. Converter devices 310 and 312 operate as described above for fault location a. Currents I1, I2, I3, I4, and I5 are measured at nodes 404, 406, 412, 414, and 420, respectively, through DC current sensors 434. DC current I4 is reversed as shown in Table 500 and DC currents I1, I2, and I3 are not reversed. SCADA system 200 makes a determination with respect to the fault being at location d due to the substantially instantaneous, real-time receipt of the directions of the DC current flows throughout system 400, including rapid changes and polarities. In response, SCADA system 200 directs mechanical isolation device 432 at nodes 412 and 414 to open and then directs restoration of service as described above for fault location a.

A fifth fault location e is defined as positioned on DC bus 402 downstream of nodes 414, 418, and 420. Converter devices 310 and 312 operate as described above for fault location a. Currents I1, I2, I3, I4, and I5 are measured at nodes 404, 406, 412, 414, and 420, respectively, through DC current sensors 434. No DC currents are reversed as shown in Table 500. SCADA system 200 makes a determination with respect to the fault being at location e due to the substantially instantaneous, real-time receipt of the directions of the DC current flows throughout system 400, including rapid changes a lack of change in polarities. In response, SCADA system 200 directs mechanical isolation device 432 at nodes 414 and 418 to open and then directs restoration of service as described above for fault location a.

The above-described HVDC transmission and distribution (T&D) systems provide a cost-effective method for transmitting HVDC power. The embodiments described herein facilitate transmitting HVDC power across relatively large distances while facilitating rapid detection and selective isolation of electrical faults on the system. The embodiments described herein also facilitate rapid restoration of those portions of the system exclusive of the faulted portions. Specifically, the devices, systems, and methods described herein include a plurality of DC-to-DC converter devices and mechanical isolation devices that define nodes in the HVDC T&D system. Also, the DC-to-DC converter devices facilitate real-time decreasing of DC electric current therethrough in the event that DC current sensed being transmitted therethrough exceeds parameters. Further, the polarities of DC electric current as measured at each node are communicated in real time to a Supervisory Control and Data Acquisition (SCADA) system. Specifically, in the event that a reversed polarity of DC electric current in one or mode nodes is sensed, the DC-to-DC converter device devices initiate operating associated mechanical isolation devices with a significantly reduced load that will approach zero amperes.

The devices, systems, and methods described herein facilitate system restoration. Once the electrical fault is cleared, the SCADA system will initiate post-fault recovery actions. Specifically, the cleared mechanical isolation devices will reclose under near-zero load and the associated DC-to-DC converter devices will increase the current transmitted through the converters and the mechanical isolation devices to restore DC power transmission to the affected portions expeditiously.

An exemplary technical effect of the methods, systems, and apparatus described herein includes at least one of: (a) decreasing a time period of fault detection and isolation on a HVDC T&D systems through a mechanical isolation device to less than 100 ms; (b) decreasing transmission of DC electric current to a fault through DC-to-DC converter devices to near-zero values in less than 100 μs, and in many cases, approximately 20 μs, i.e., approximately three orders of magnitude less than the time to isolate through a mechanical isolation device; (c) decreasing transmission of DC electric current through DC mechanical isolation devices to near-zero values to facilitate rapid opening to clear electrical fault conditions and reclosing to restore power transmission; (d) determining, i.e., pin-pointing a location of an electrical fault on a HVDC T&D system through determining the polarities of DC electric current transmitted through predetermined nodes defined therein; and (e) substantially reducing a need to use slower acting DC circuit breakers to isolate faults.

Fault isolation occurs approximately three orders of magnitude more rapidly than the typical five milliseconds (ms) needed to reduce a partial for a reduction of service life to the affected components. Such rapid fault isolation is primarily due to the localized communications between current sensor 334 and controller 336.

Exemplary embodiments of HVDC transmission and distribution (T&D) systems for coupling power generation facilities and the grid, and methods for operating the same, are described above in detail. The HVDC T&D systems, DC-to-DC converter devices, and methods of operating such systems and devices are not limited to the specific embodiments described herein, but rather, components of systems and/or steps of the methods may be utilized independently and separately from other components and/or steps described herein. For example, the methods may also be used in combination with other systems requiring HVDC transmission and methods, and are not limited to practice with only the HVDC T&D systems, DC-to-DC converter devices, and methods as described herein. Rather, the exemplary embodiment can be implemented and utilized in connection with many other DC transmission applications that are currently configured to receive and accept DC-to-DC converter devices, e.g., and without limitation, DC distribution systems in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct current (DC) transmission and distribution (T&D) system comprising:
   a plurality of DC-to-DC converter devices at least partially defining a plurality of isolatable portions of said DC T&D system; and
   a DC T&D control system coupled to said plurality of DC-to-DC converter devices, said DC T&D control system comprising:
   a plurality of current sensors, wherein at least one of said plurality of current sensors is positioned at at least one DC-to-DC converter device of said plurality of DC-to-DC converter devices, wherein said at least one current sensor of said plurality of current sensors is configured to transmit at least one signal representative of a value of DC electric current transmission through said at least one DC-to-DC converter device;
   a plurality of processors, wherein at least one processor of said plurality of processors is coupled to said at least one current sensor and said at least one DC-to-DC converter device, said at least one processor configured to regulate electrical parameters comprising at least DC current transmission through said at least one DC-to-DC converter device as a function of the value of DC current transmission through said at least one DC-to-DC converter device;
   a plurality of mechanical isolation devices configured to remove at least a portion of said DC T&D system from service, wherein said plurality of DC-to-DC converter devices are further configured to decrease DC electric current transmission through said at least a portion of said DC T&D system prior to actuation of at least one mechanical isolation device of said plurality of mechanical isolation devices;
   wherein said plurality of current sensors and said plurality of mechanical isolation devices are positioned within said DC T&D system to define a plurality of nodes therein, thereby further at least partially defining said plurality of isolatable portions of said DC T&D system in conjunction with said plurality of DC-to-DC converter devices; and
   wherein said at least one processor is further configured to:
   generate a digital matrix that includes each node of said plurality of nodes;
   assign a numerical value of positive one for DC electric fault current transmission detected by a first portion of said plurality of current sensors transmitted through at least a first portion of said plurality of nodes in the first direction; and
   assign a numerical value of negative one for DC electric fault current transmission detected by a second portion of said plurality of current sensors transmitted through at least a second portion of said plurality of nodes in the second direction.

2. The DC T&D system in accordance with claim 1 further comprising at least one electric power generation device, wherein said plurality of DC-to-DC converter devices are coupled to said at least one electric power generation device through a plurality of electric conduits.

3. The DC T&D system in accordance with claim 2, wherein said at least one electric power generation device comprises at least one renewable energy device.

4. The DC T&D system in accordance with claim 3, wherein said at least one renewable energy device comprises at least one wind turbine generator.

5. The DC T&D system in accordance with claim 1, wherein said plurality of DC-to-DC converter devices comprises at least one DC-to-DC converter device positioned within an offshore DC station.

6. The DC T&D system in accordance with claim 1, wherein said plurality of processors are further configured to restore portions of said DC T&D system through said plurality of DC-to-DC converter devices at least partially as a function of the status of said at least one mechanical isolation device.

7. The DC T&D system in accordance with claim 6, wherein said plurality of DC-to-DC converter devices are further configured to increase DC electric current transmission through at least a portion of said DC T&D system not isolated through said at least one mechanical isolation device.

8. The DC T&D system in accordance with claim 1, wherein said plurality of processors is further configured to:
decrease DC electric current transmission through said at least one DC-to-DC converter device to decrease DC electric current transmission through said at least one of said plurality of isolatable portions; and
actuate said at least one mechanical isolation device to isolate said at least one of said plurality of isolatable portions as a function of the assignment of the numerical values.

9. The DC T&D system in accordance with claim 8, wherein said at least one processor is further configured to:
unisolate said at least one of said plurality of isolatable portions through actuating said at least one mechanical isolation device; and
increase DC electric current transmission through at least a portion of said DC T&D system not isolated through said at least one DC-to-DC converter device.

10. The DC T&D system in accordance with claim 9, wherein said plurality of processors are further configured to isolate and restore said at least one of said plurality of isolatable portions at least partially as a function of the direction of DC power transmission through said plurality of nodes.

11. A method of operating a direct current (DC) transmission and distribution (T&D) system including a plurality of DC-to-DC converter devices and a plurality of nodes each including at least one mechanical isolation device, and a plurality of isolatable portions of the DC T&D system defined between the nodes, said method comprising:
decreasing the DC electric current transmission through at least a portion of the plurality of isolatable portions at the electrical fault comprising regulating the at least one DC-to-DC converter device;
determining a direction of DC electric current transmission through each node of the plurality of nodes;
determining a location of an electrical fault on the DC T&D system at least partially as a function of a direction of DC electric current transmission through each node of the plurality of nodes;
isolating at least a portion of the plurality of isolatable portions comprising opening the at least one mechanical isolation device;
generating a digital matrix through at least one processor, wherein the digital matrix includes each node of the plurality of nodes;
assigning a numerical value of positive one in the digital matrix through the at least one processor, wherein the numerical value of positive one is representative of DC electric fault current transmission in the forward direction through at least one node of the plurality of nodes; and
assigning a numerical value of negative one in the digital matrix through the at least one processor, wherein the numerical value of negative one is representative of DC electric fault current transmission in the reverse direction through at least one node of the plurality of nodes.

12. The method in accordance with claim 11, wherein decreasing the DC electric current transmission through at least a portion of the plurality of isolatable portions comprises decreasing DC electric current transmission through the at least one mechanical isolation device prior to actuation of the at least one mechanical isolation device.

13. The method in accordance with claim 12, wherein decreasing the DC electric current transmission through at least a portion of the plurality of isolatable portions further comprises opening the at least one mechanical isolation device when current transmitted through the at least one mechanical isolation device is approximately zero.

14. The method in accordance with claim 11, wherein regulating the at least one DC-to-DC converter device comprises:
regulating a first DC-to-DC converter device at a renewable energy source; and
regulating a second DC-to-DC converter device at an offshore DC station.

15. The method in accordance with claim 11 further comprising:
at least partially restoring the at least a portion of the plurality of isolatable portions through closing the at least one mechanical isolation device; and
increasing DC electric current transmission through the at least a portion of the plurality of isolatable portions comprising regulating at least one DC-to-DC converter device.

* * * * *